US012233655B2

(12) United States Patent
Tsuchiya

(10) Patent No.: US 12,233,655 B2
(45) **Date of Patent: *Feb. 25, 2025**

(54) PRINTER DEVICE

(71) Applicant: Toshiba Tec Kabushiki Kaisha, Tokyo (JP)

(72) Inventor: Motohito Tsuchiya, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,040

(22) Filed: Dec. 7, 2023

(65) Prior Publication Data

US 2024/0123746 A1 Apr. 18, 2024

Related U.S. Application Data

(63) Continuation of application No. 17/397,909, filed on Aug. 9, 2021, now Pat. No. 11,890,884.

(30) Foreign Application Priority Data

Sep. 24, 2020 (JP) ................................ 2020-160072

(51) Int. Cl.

*B41J 33/14* (2006.01)
*B41J 2/325* (2006.01)
*B41J 11/70* (2006.01)

(52) U.S. Cl.

CPC .............. *B41J 33/14* (2013.01); *B41J 2/325* (2013.01); *B41J 11/70* (2013.01)

(58) Field of Classification Search

CPC ........ B41J 3/4075; B41J 2/325; B41J 11/703; B41J 3/60; B41J 2/32; B41J 33/14; B41J 11/70; B41J 2/315; B41F 16/00

See application file for complete search history.

(56) References Cited

U.S. PATENT DOCUMENTS 7,319,472 B2 1/2008 Inoue
11,890,884 B2 * 2/2024 Tsuchiya .................. B41J 2/325
2009/0015649 A1 1/2009 Keeton et al.

FOREIGN PATENT DOCUMENTS

JP 2013-052605 A 3/2013

* cited by examiner

*Primary Examiner* — Kristal Feggins
(74) *Attorney, Agent, or Firm* — Kim & Stewart LLP

(57) ABSTRACT

A printing device for printing on a label sheet includes a first print head to perform printing on a first side of a label sheet being conveyed along a conveyance path. The label sheet is interposed between the first print head and a first roller. A second print head is upstream of the first print head and performs printing on a second side of the label sheet. A second roller is adjacent the second print head across the conveyance path. A cutter is downstream of the first print head to cut off a first portion of the label sheet. A processor is configured to cause the label sheet to be conveyed in a second direction after the first portion is cut off from the sheet so that the cut end of the sheet reaches the first print head.

20 Claims, 7 Drawing Sheets

PRINTER DEVICE

CROSS-REFERENCE TO RELATED APPLICATIONS

This application is a continuation of U.S. patent application Ser. No. 17/397,909, filed Aug. 9, 2021, which is based upon and claims the benefit of priority from Japanese Patent Application No. 2020-160072, filed Sep. 24, 2020, the entire contents of which are incorporated herein by reference.

FIELD

Embodiments of the present invention relate generally to a printing device and a method of controlling the printing device.

BACKGROUND

In the related art, a printer that prints on labels that do not have a backing liner or label paper mount (called linerless labels) is known. On the back surface of each such label, a pressure sensitive adhesive such as a glue is applied. The labels are stored in the printing device in a form of a label sheet wound in a roll. The printer performs printing on the surface of each label as the wound label sheet is fed to a print head (such as a thermal print head). After the printing, the printer cuts the label sheet with a cutter to issue a label that can be attached to an object such as a commodity, and prepares for the next printing by feeding the label sheet backwards in a direction opposite to the printing direction.

In the above-described label sheet, printing is generally performed on a front surface of the label sheet, but can also or instead be performed on the back surface. For example, in a case where a pressure sensitive adhesive is applied only to a particular region, such as an edge portion, on the back surface of the label sheet, printing can be performed on the region on which the pressure sensitive adhesive has not been applied. In such a case, the printing device may comprise a first print head that performs printing from the front surface side and a second print head that performs printing from the back surface side spaced along conveyance path of the label sheet.

However, with the above-described configuration for the double-sided printing, after printing is done and the back-feeding is performed, the pressure sensitive adhesive applied to the back surface of the label sheet may stick to a conveyance mechanism, such as a conveyance roller, which may cause a paper jam at the time of the next printing.

DETAILED DESCRIPTION

In general, according to one embodiment, a printing device for printing on a label sheet includes a first print head configured to perform printing on a first surface of a label sheet conveyed along a conveyance path in a first direction, a first roller adjacent to the first print head across the conveyance path, a second print head upstream of the first print head along the conveyance path and configured to perform printing on a second surface of the label sheet, a second roller adjacent to the second print head across the conveyance path, a cutting unit downstream of the first print head along the conveyance path and configured to cut off a first portion of the label sheet, and a processor. The processor is configured to, after the first portion is cut off, cause the label sheet to be conveyed in a second direction opposite to the first direction such that an end of the label sheet from which the first portion was cut off reaches the first print head.

Hereinafter, a printing device according to one or more embodiments will be described with reference to the accompanying drawings. In the embodiments, a thermal printer is described as one example of a printing device 1, but the present disclosure is not limited thereto.

Figure 1:
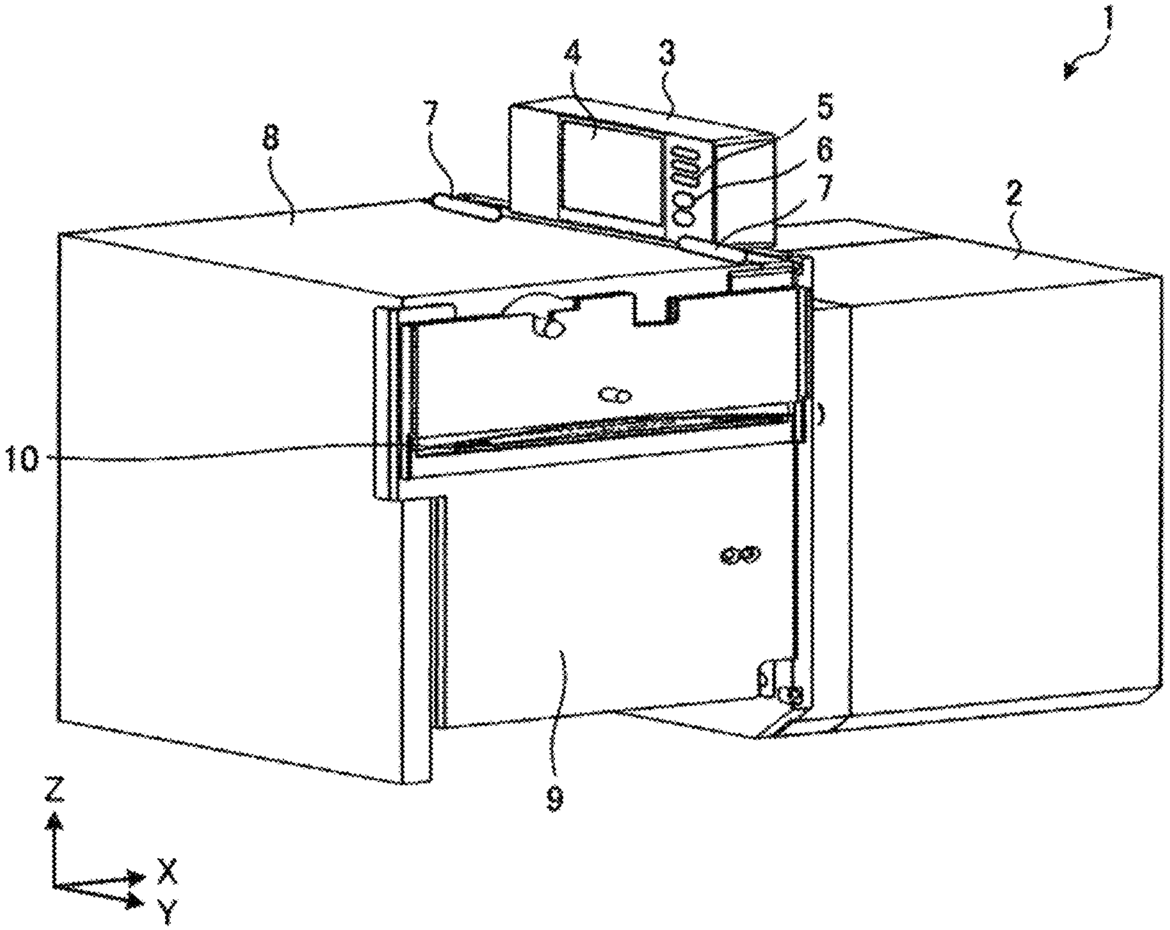
FIG. 1 is an external perspective view of a printing device according to an embodiment.

FIG. 1 is a perspective view of an external appearance of a printing device 1 according to an embodiment. As shown in FIG. 1, the printing device 1 comprises a case 2 and a case 8 connected to the left side of the case 2. An operation display unit 3 is provided on an upper surface of the case 8. The operation display unit 3 includes a display unit 4 and an operation unit 5. The display unit 4 is a liquid crystal display with a backlight, but other types of display devices may be used. The operation unit 5 includes a plurality of operation buttons 6 including a power button and the like.

Figure 2:
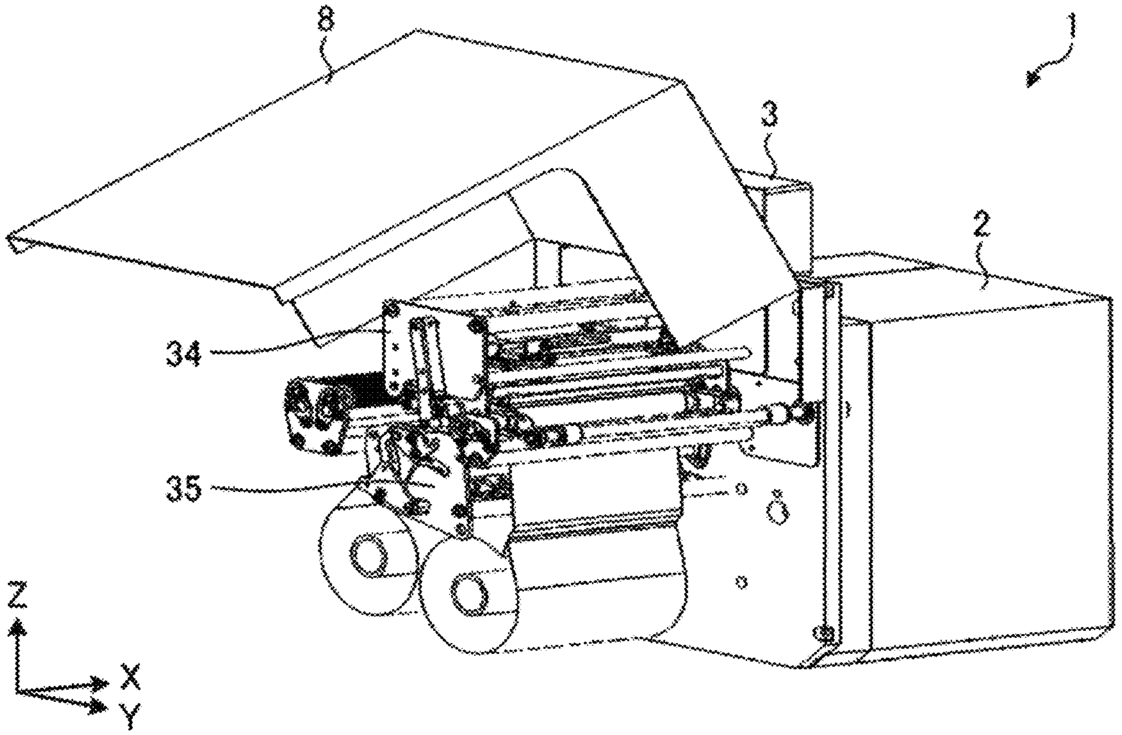
FIG. 2 is a diagram illustrating a printing device in a state where a case thereof is opened.

As shown in FIG. 2, the case 8 can swing open from by rotating around a hinge 7 (see FIG. 1). The printing device 1 comprises a first printing unit 34, a second printing unit 35 to perform printing on front and back surfaces of a label sheet 20 stored inside the case 8. Therefore, by rotating the case 8 about the hinge 7 and lifting the case 8 upward, maintenance of the internal mechanism of the printing device 1 can be easily performed.

A cutter unit 9 is provided on the front surface of the case 8. The cutter unit 9 includes a cutting unit 37, which will be described below, and cuts the printed label. A label issuing port 10 through which a label is issued or discharged after printing is provided between the blades of the cutter unit 9. The label cut by the cutter unit 9 is issued from the label issuing port 10.

Figure 3:
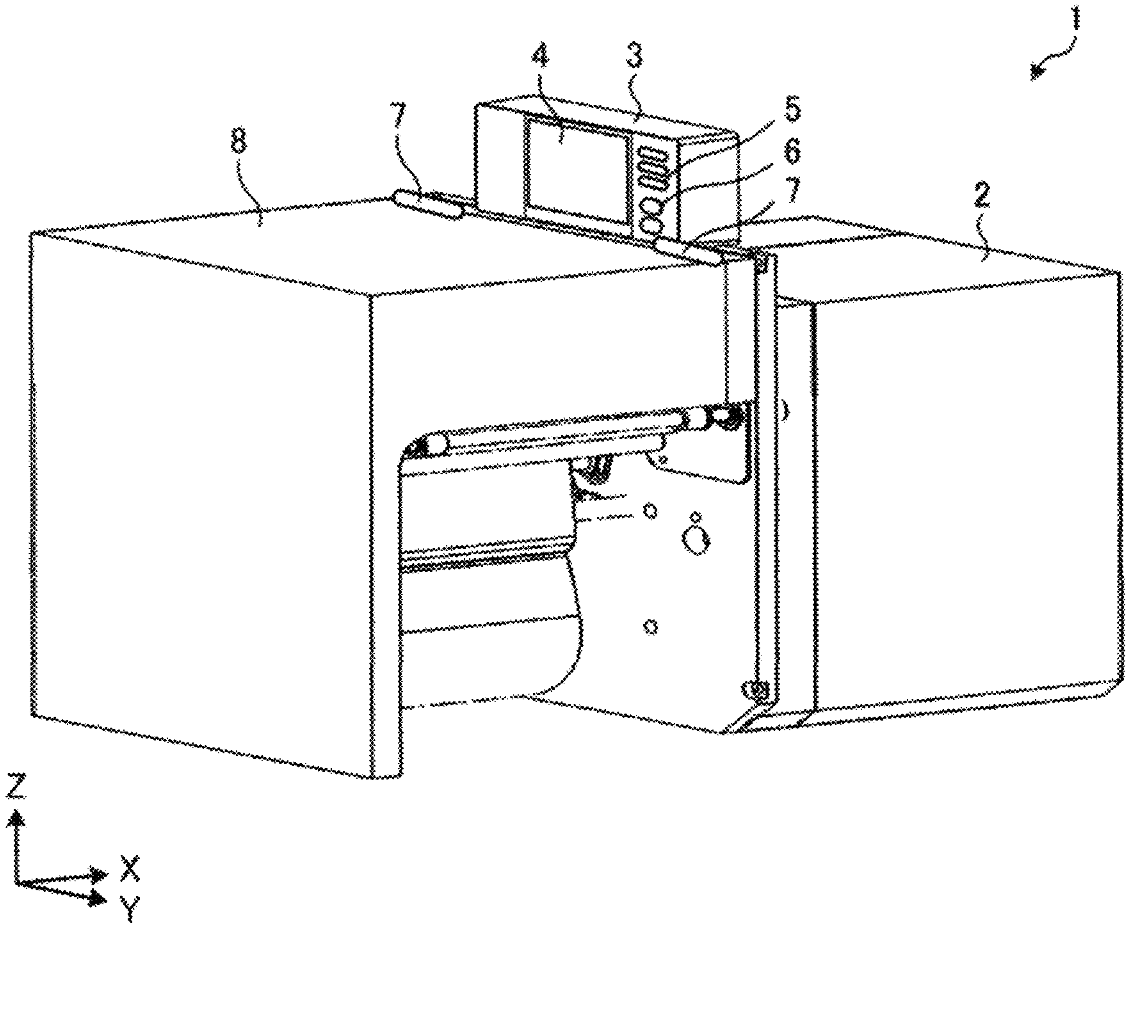
FIG. 3 is a diagram illustrating a printing device without a cutter unit.

As illustrated in FIG. 3, the cutter unit 9 may be attachable to and detachable from the case 8. FIG. 3 illustrates a state in which the cutter unit 9 is removed from the printing device 1 illustrated in FIG. 1.

The case 2 houses a drive source such as a motor or the like for driving various rotors or the like housed in the case 8, a control unit 100 (see FIG. 6), and the like.

Figure 4:
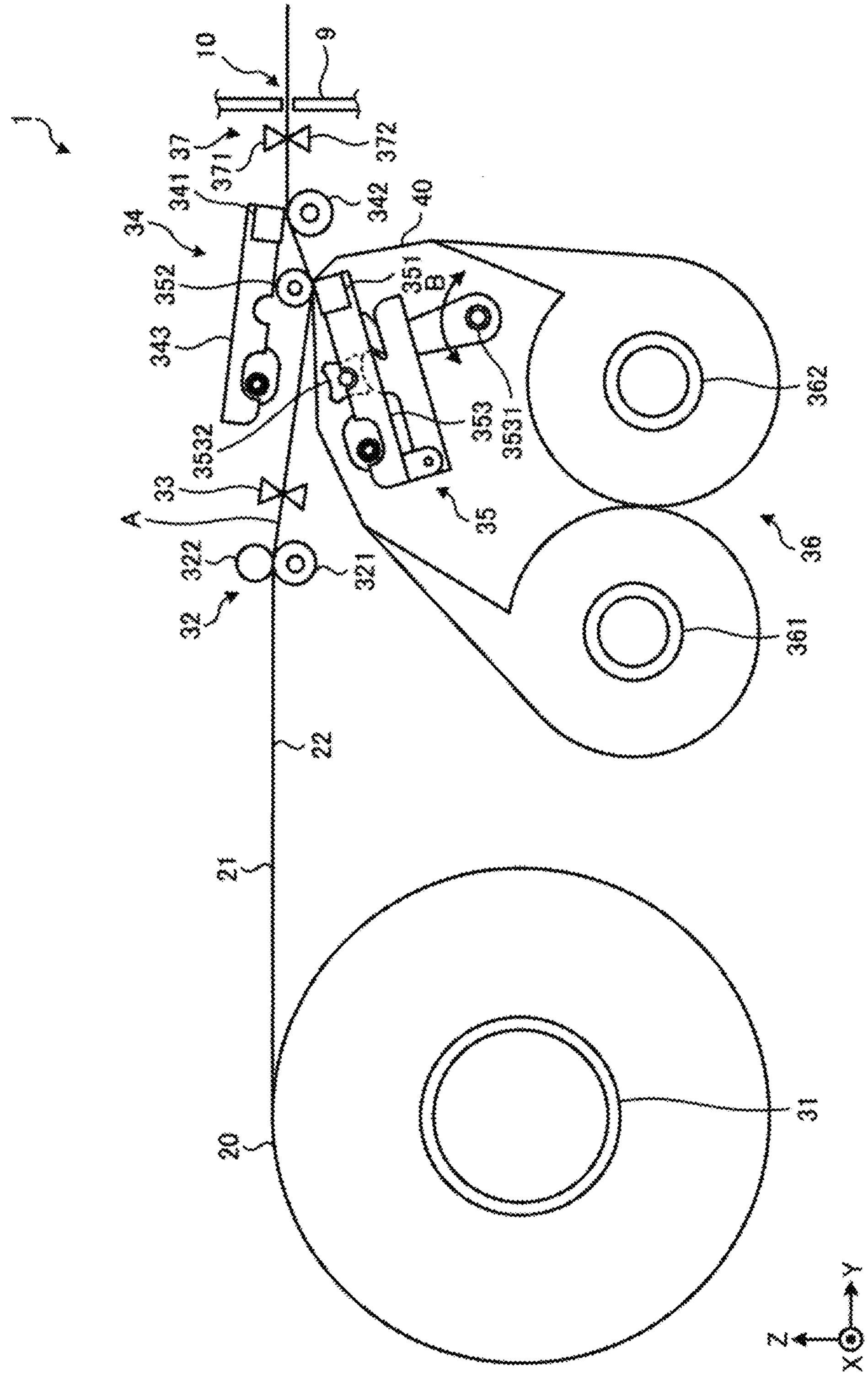
FIG. 4 is a schematic side view illustrating an internal configuration of a printing device.

FIG. 4 is a schematic side view showing the internal structure of the printing device 1. As shown in FIG. 4, the printing device 1 includes a sheet holding unit 31, a pull-out roller 32, a detection unit 33, a first printing unit 34, a second printing unit 35, an ink ribbon supply device 36, and the cutting unit 37 inside the case 8.

The sheet holding unit 31 is a shaft that holds the label sheet 20 wound in a roll shape. The label sheet 20 includes a plurality of labels and does not have without a liner (that is, there is no separable label mount or backing material on which the labels are initially disposed). The labels on label sheet 20 are so called linerless labels, and a pressure sensitive adhesive such as glue is applied to at least a portion of the back surface of each label.

Figure 5A:
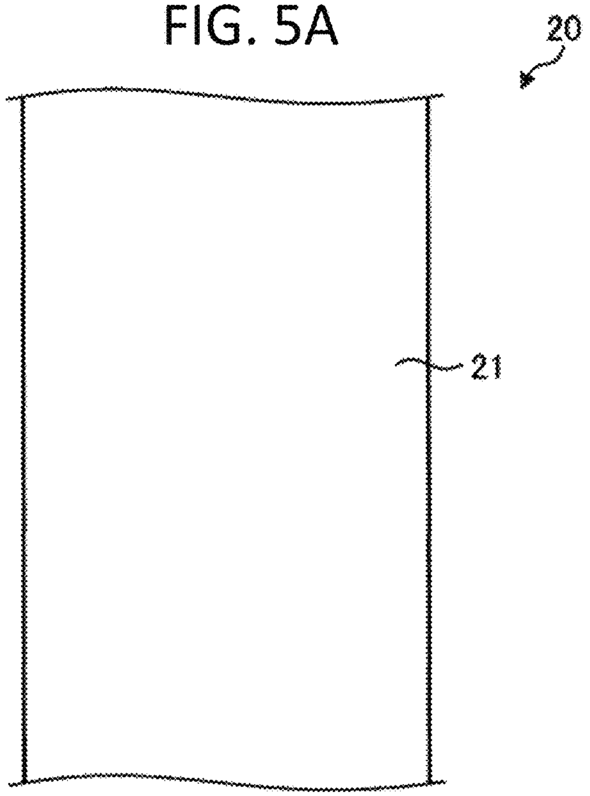
FIG. 5A and FIG. 5B are diagrams schematically illustrating a label sheet.
Figure 5B:
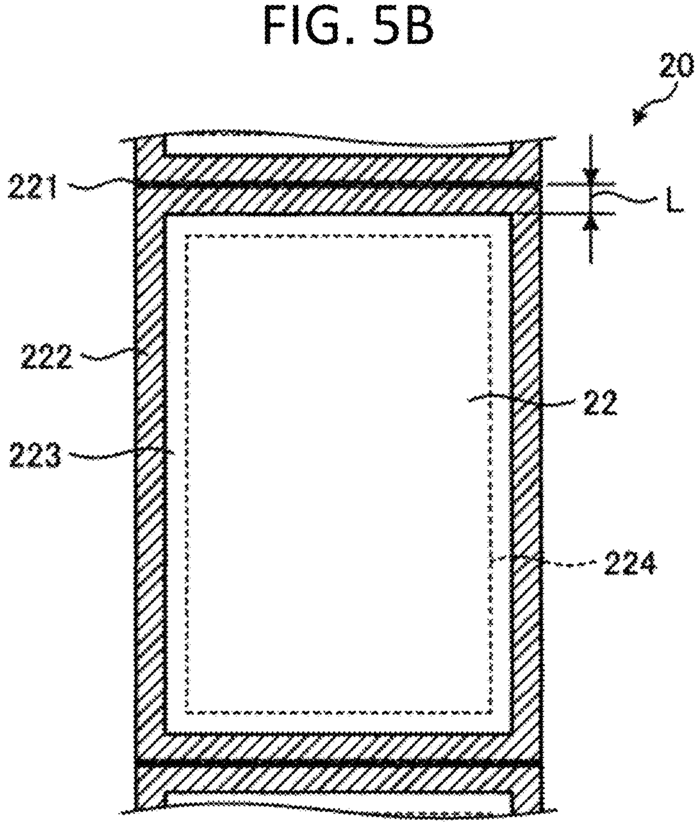

FIGS. 5A and 5B are diagrams schematically illustrating an example of the label sheet 20. FIG. 5A shows a front surface 21 of the label sheet 20, and FIG. 5B shows a back surface 22 of the label sheet 20.

The surface 21 of the label sheet 20 is coated with a chemical agent which changes color when heated. That is, the label sheet 20 is a thermal sheet.

A mark referred to as a black mark 221 is printed on the back surface 22 of the label sheet 20. The black mark 221 indicates a cutting position on the label sheet 20. That is, a section of the label sheet 20 between two adjacent black marks 221 corresponds to one label that will ultimately be cut from the label sheet 20 as an individual label.

In this example, a pressure sensitive adhesive has been applied to just a partial region of the back surface 22 of the label sheet 20. Specifically, the pressure sensitive adhesive is on an edge portion 222 of each label delineated by a pair of black marks 221, and the region inside the edge portion 222 of each label is central region 223 to which the pressure sensitive adhesive has not been applied. The width of the edge portion 222 is not particularly limited. For example, the width L of a part of the edge portion 222 directly adjacent to the black mark 221 and parallel to the black mark 221 may be set based on the physical separation distance between the first print head 341 and the second print head 351.

In addition, the configuration of the label sheet 20 is not limited to the entirely linerless label example. For example, the label sheet 20 may have a two-layer structure or a multilayer structure in which paper (thermosensitive paper) at the front surface 21 and the paper of the back surface 22 are bonded to each other at the edge portion 222. In such a case, for example, the central 223 or a region 224 of surface 21 but within the boundary of central region 223 as illustrated in FIG. 5B may be peelable or otherwise separable from the label sheet 20 by incorporation of a perforation or a seal structure.

Returning to FIG. 4, the label sheet 20 held by the sheet holding unit 31 is pulled out by the pull-out roller 32. The pull-out roller 32 includes a driving roller 321 and a driven roller 322. The driving roller 321 and the driven roller 322 are disposed to face each other. The driving roller 321 rotates while holding the label sheet 20 together with the driven roller 322, so that the label sheet 20 is conveyed. The surface of the driving roller 321 in FIG. 4 in contact with the back surface 22 of the label sheet 20 is subjected to adhesion amount reduction treatment for reducing the amount of the pressure sensitive adhesive transferred to the driving roller 321.

The label sheet 20 pulled out by the pull-out roller 32 is conveyed to the conveyance path A. The conveyance path A is a path between the pull-out roller 32 and the label issuing port 10. That is, the label sheet 20 pulled out by the pull-out roller 32 is conveyed to the label issuing port 10 via the conveyance path A.

Hereinafter, in the conveyance path A, the side from which the label sheet 20 is supplied by the pull-out roller 32 is referred to as "upstream", and the side to which the label sheet 20 is discharged from the label issuing port 10 is referred to as "downstream". In addition, conveying the label sheet 20 toward the label issuing port 10 along the conveyance path A may be referred to as "feed", and conveying the label sheet 20 in the opposite direction may be referred to as "back feed".

On the upstream side of the conveyance path A, the detection unit 33 is provided for detecting the black mark 221 on the back surface 22 of the label sheet 20. The detection unit 33 is, for example, a transmissive or reflective photoelectric sensor. The detection unit 33 detects the black mark 221 by irradiating the label sheet 20 with light and detecting light reflected by the label sheet 20 or light transmitted through the label sheet 20.

In addition, the first printing unit 34 is provided for performing printing on the front surface 21 of the label sheet 20 in the conveyance path A. Specifically, the first printing unit 34 is provided downstream of the detection unit 33 in the conveyance path A. The first printing unit 34 includes a first print head 341 and a first platen roller 342.

The first print head 341 is a line-type thermal head in which a plurality of heat generation elements is arranged in a line in a direction substantially orthogonal to the conveyance direction of the label sheet 20. The first print head 341 is a direct thermal print head that performs printing by applying heat to the front surface 21 of the label sheet 20 by the heat generation elements.

The first print head 341 is fixed to a first head holding unit 343 that is attached to a frame. The first print head 341 is biased by the first head holding unit 343 to press against the first platen roller 342.

The first platen roller 342 is a roller facing the first print head 341. The first platen roller 342 conveys the label sheet 20 by rotating such that the label sheet 20 is sandwiched between the first platen roller 342 and the first print head 341. The surface of the platen roller 342, which is in contact with the back surface of the label sheet 20, is subjected to adhesive amount reduction treatment for reducing the amount of the adhesive transferred to the platen roller 342.

Figure 6:
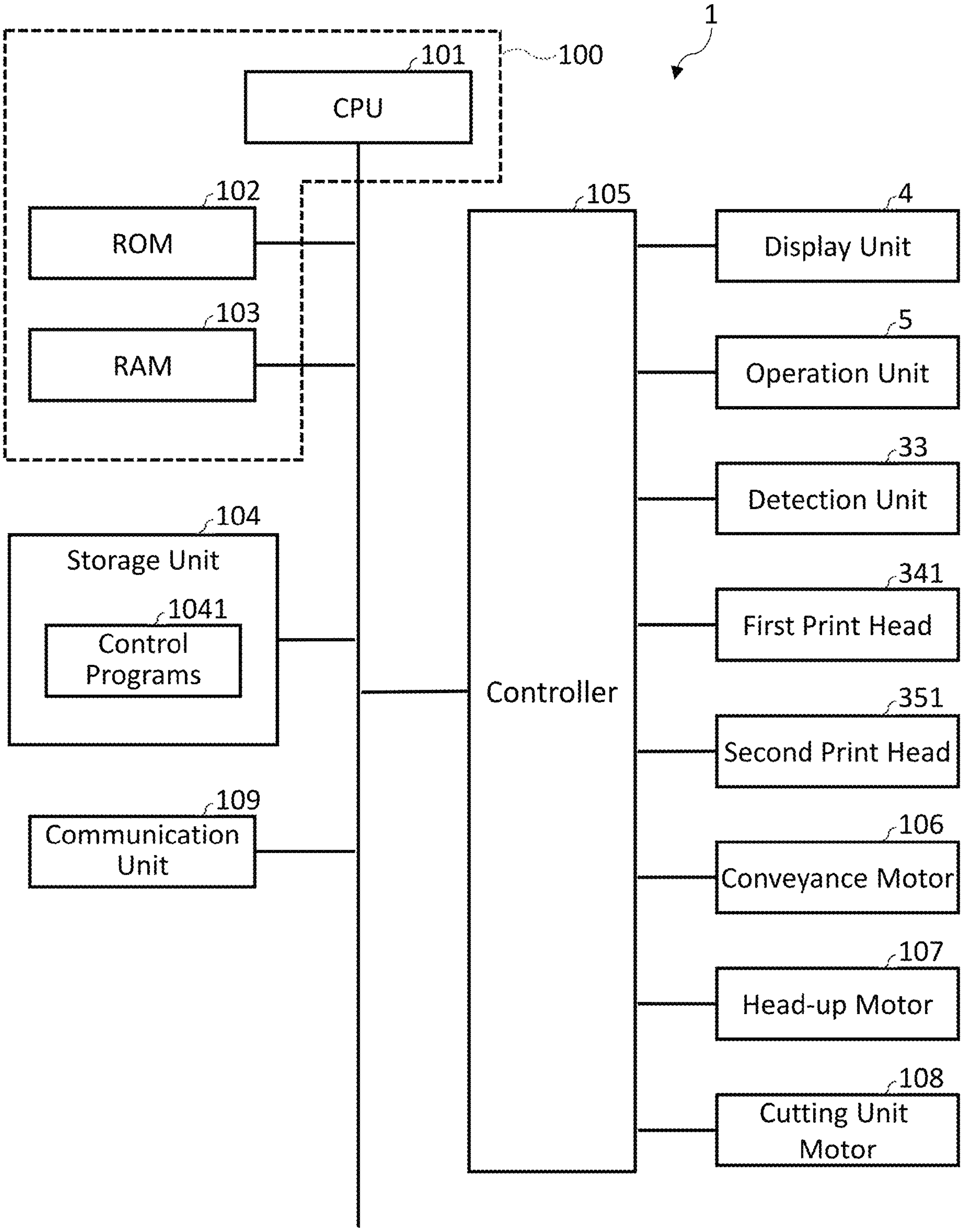
FIG. 6 is a block diagram of a printing device.

In the above configuration, the first print head 341 prints on the surface of the label sheet 20 conveyed in the feed direction by generating heat of the heat generation elements under the control of the control unit 100 (see FIG. 6). More specifically, the control unit 100 prints on the surface of the label sheet 20 by generating heat of the first print head 341 based on the detection timing of the black mark 221 by the detection unit 33 and the conveyance speed of the label sheet 20.

In addition, the second printing unit 35 is provided for performing printing on the back surface 22 of the label sheet 20 in the conveyance path A. The second printing unit 35 is provided on the upstream side of the first printing unit 34 in the conveyance path A. More specifically, the second printing unit 35 is provided between the detection unit 33 and the first printing unit 34. The second unit 35 includes a second print head 351 and a second platen roller 352.

The second print head 351 is a line-type thermal head in which a plurality of heat generation elements is arranged in a line in a direction substantially orthogonal to the conveyance direction of the label sheet 20. The second print head 351 is a thermal transfer type print head that prints by transferring ink from an ink ribbon 40 to the back surface of the label sheet 20.

The second print head 351 is fixed to a second head holding unit 353 rotatably attached to a frame. More specifically, the second head holding unit 353 is supported so as to be pivotable about a pivot shaft 3531 in a direction indicated by arrow B in FIG. 4.

The second head holding unit 353 has an abutting portion indicated by broken lines in FIG. 4 and having a smooth curved surface shape, and the abutting portion abuts against a cam 3532 rotatably attached to a frame. The second head holding unit 353 rotates in the direction of the arrow B about the pivot shaft 3531 as a fulcrum in accordance with the rotation operation of the cam 3532, thereby bringing the second print head 351 into contact with and away from the second platen roller 352. With this configuration, the second head holding unit 353 functions as a head-up mechanism for separating the second print head 351 from the second platen roller 352, and a head abutting mechanism for bringing the second print head 351 into contact with the second platen roller 352. That is, in a case where the head-up mechanism is operated, the second print head 351 is separated from the second platen roller 352, and in a case where the head abutting mechanism is operated, the second print head 351 is biased towards the second platen roller 352 and abuts against the second platen roller.

The second platen roller 352 is a roller facing the second print head 351. The second platen roller 352 conveys the label sheet 20 by rotating such that the label sheet 20 is sandwiched between the second platen roller 352 and the ink ribbon 40.

The ink ribbon supply device 36 includes a ribbon holding shaft 361 and a ribbon winding shaft 362. The ribbon holding shaft 361 winds the unused portion of the ink ribbon 40 in a roll shape. The ribbon winding shaft 362 is a shaft around which the used portion of the ink ribbon 40 is wound. The ribbon winding shaft 362 rotates the ink ribbon in a take-up direction (clockwise direction in FIG. 4) by a motor so as to take up the ink ribbon 40 at a speed substantially equal to or higher than a conveyance speed of the ink ribbon 40 by the second platen roller 352.

The ink ribbon supply device 36 includes a guide shaft that guides the ink ribbon 40 drawn out from the ribbon holding shaft 361. The guide shaft is provided along the conveyance path of the ink ribbon 40 between the ribbon holding shaft 361 and the ribbon winding shaft 362. The ink ribbon 40 is stretched over the guide shaft provided in this manner.

The unused portion of the ink ribbon 40 reaches a printing position where the second print head 351 and the second platen roller 352 abut against each other, and the ink is transferred, that is, printing is performed on the back surface 22 of the label sheet 20. The used portion of the ink ribbon 40 is wound around the ribbon winding shaft 362 and collected.

In the above configuration, the second print head 351 prints on the back surface 22 of the label sheet 20 being conveyed in the feed direction by generating heat with the heat generation elements under the control of the control unit 100 (see FIG. 6). More specifically, the control unit 100 prints on the central region 223 provided on the back surface 22 of the label sheet 20 by controlling the heat generation from the second print head 351 based on the detection timing of the black mark 221 by the detection unit 33 and the conveyance speed of the label sheet 20. Further, the control unit 100 controls the second print head 351 to come into contact with the second platen roller 352 for printing by moving the second head holding unit 353.

On the conveyance path A, the cutting unit 37 is provided for cutting the label sheet 20 after printing is completed. Specifically, the cutting unit 37 is provided on the downstream side of the first printing unit 34 and before the label issuing port 10 on the conveyance path A.

The cutting unit 37 is a guillotine cutting mechanism including a movable blade 371 and a fixed blade 372 that face each other with the conveyance path A interposed therebetween. The cutting unit 37 moves the movable blade 371 with respect to the fixed blade 372 under the control of the control unit 100 to cut the front-end portion of the label sheet 20 sandwiched between the movable blade 371 and the fixed blade 372. More specifically, the control unit 100 cause the label sheet 20 to be cut along the black mark 221. Then, the front-end portion of the label sheet 20 (or a label) cut by the cutting unit 37 is discharged from the label issuing port 10 provided in the gap between the cover 8 and the cutter unit 9. The surfaces of the movable blade 371 and the fixed blade 372 are treated with adhesion amount reduction treatment to reduce the amount of the adhesive transferred from the back surface 22 of the label sheet 20 to the movable and fixed blades 371 and 372.

Next, a positional relationship between the first printing unit 34 and the second printing unit 35 will be described with reference to FIG. 4.

As illustrated in FIG. 4, in the printing device 1, the second printing unit 35 is disposed on the upstream side of the first printing unit 34 in consideration of its dimensions and the storage position of the ink ribbon supply device 36 in the case 8.

The first platen roller 342 of the first printing unit 34 and the second platen roller 352 of the second printing unit 35 are disposed such that the conveyance path A bends in a substantially S-shape.

More specifically, the second platen roller 352 comes into contact with the front surface 21 of the label sheet 20 conveyed from the pull-out roller 32, and the first platen roller 342 comes into contact with the back surface 22 of the label sheet 20 conveyed from the second platen roller 352, thereby bending the conveyance path A into a substantially S-shape. The first platen roller 342 and the second platen roller 352 are disposed such that the inclination of the conveyance path A between the first platen roller 342 and the second platen roller 352 is steeper than the inclination of the other parts of the conveyance path A.

With the above configuration, the first printing unit 34 does not interfere with the second platen roller 352. Similarly, the second printing unit 35 does not interfere with the second platen roller 352. Accordingly, the first print head 341 and the second print head 351 in the conveyance path A can be disposed physically close to each other.

Here, the separation distance between the first print head 341 and the second print head 351 is preferably small, and may be set according to the dimensions of the label sheet 20 and the like. For example, when a label sheet 20 as depicted in FIGS. 5A and 5B is used, it is preferable that the separation distance between the first print head 341 and the second print head 351 is the distance from the black mark 221 to the edge portion 222 in the conveyance direction, that is, the width L depicted in FIG. 5B. In the printing device 1 of the present example, the separation distance between the first print head 341 and the second print head 351 is approximately equal to the width L depicted in FIG. 5B.

Next, a hardware configuration of the printing device 1 will be described with reference to FIG. 6. FIG. 6 is a hardware block diagram of the printing device 1.

As shown in FIG. 6, the printing device 1 comprises a CPU (Central Processing Unit) 101, a ROM (Read Only Memory) 102, and a RAM (Random Access Memory) 103.

The CPU 101 is a processor for controlling the operations of the printing device 1. The ROM 102 stores various programs. The RAM 103 temporarily stores programs and various kinds of information. The CPU 101, the ROM 102, and the RAM 103 are connected via a bus or the like. The CPU 101, the ROM 102, and the RAM 103 make up the control unit 100. That is, the control unit 100 executes the control process related to the printing device 1 according to one or more control programs 1041 stored in the ROM 102 and/or a storage unit 104 and loaded into the RAM 103.

The storage unit 104 is an HDD (Hard Disc Drive) or a non-volatile memory such as a flash memory that can store information even after power is turned off. The storage unit 104 stores the control programs 1041 for controlling operations of the printing device 1. In addition, the storage unit 104 stores various setting information related to the operation of the printing device 1.

The control unit 100 is connected to a controller 105 that controls input and output of data via a bus or the like. The controller 105 is connected to a conveyance motor 106, a head-up motor 107, a cutting unit motor 108, and the like in addition to the display unit 4, the operation unit 5, the detection unit 33, the first print head 341, the second print head 351, and the like.

Here, the conveyance motor 106 drives various rollers related to the conveyance of the label sheet 20, such as the pull-out roller 32 or the driving roller 321, the first platen roller 342, and the second platen roller 352. The conveyance motor 106 is, for example, a stepping motor or the like, and works as a conveyance mechanism of the label sheet 20 together with the above-described various rollers or the like. The conveyance motor 106 may be provided for each roller or may be shared by a plurality of rollers.

The controller 105 controls the operation of the conveyance motor 106 under the control of the control unit 100 to feed or back feed the label sheet 20 at a predetermined conveyance speed. The conveyance motor 106 may drive other components other than the above-described rollers (for example, the rotatable ribbon winding shaft 362).

The head-up motor 107 rotates the cam 3532. Under the control of the control unit 100, the controller 105 controls the operation of the head-up motor 107, that is, the operation of the head-up mechanism and the head abutting mechanism, so as to separate the second print head 351 from the second platen roller 352 or bring the second print head 351 into contact with the second platen roller 352.

The cutting unit motor 108 causes the movable blade 371 of the cutting unit 37 to move to the fixed blade 372. The controller 105 moves the movable blade 371 to the fixed blade 372 or separates the movable blade 371 from the fixed blade 372 by controlling the operation of the cutting unit motor 108 under the control of the control unit 100.

The control unit 100 is connected to a communication unit 109 via a bus or the like. The communication unit 109 is a network interface configured to communicate with an external apparatus such as an information processing apparatus via a communication line or network. The communication unit 109 acquires print data to be printed on the front surface 21 and/or the back surface 22 of the label sheet 20 from such an external device. The communication line may be a wired communication line or a wireless communication line.

In the printing device 1 having the above-described configuration, the control unit 100 controls each component of the printing device 1 to print on the label sheet 20 according to the control programs 1041.

For example, in a case where the control unit 100 is instructed to print a label through the operation unit 5, the control unit 100 drives the conveyance motor 106 through the controller 105 to rotate the driven roller 322, the first print head 341, and the second print head 351 in the feed direction. Accordingly, the label sheet 20 wound around the sheet holding unit 31 is conveyed to the conveyance path A.

When the black mark 221 is detected by the detection unit 33 as the label sheet 20 is conveyed, the control unit 100 receives the detection signal via the controller 105. Next, the control unit 100 determines the print timing at which printing is performed by the first printing unit 34 and the second printing unit 35 and the cutting timing at which the label sheet 20 is cut by the cutting unit 37 based on the predetermined convey speed of the label sheet 20 and the arrangement positions of the first printing unit 34, the second printing unit 35, and the cutting unit 37 in the conveyance path A.

Subsequently, the control unit 100 controls the controller 105 to apply a voltage to the heat generation elements of the first print head 341 to print an image (e.g., a character string or the like) corresponding to the print data for the front surface on the front surface 21 of the label sheet 20 based on the determined print timing. Further, the control unit 100 controls the controller 105 to apply a voltage to the heat generation elements of the second print head 351, thereby printing an image corresponding to the print data for the back surface on the back surface 22 of the label sheet 20 based on the determined print timing. When the second print head 351 does not perform printing on the back surface 22 of the label sheet 20, the control unit 100 controls the controller 105 to drive the head-up motor 107 to separate the second print head 351 from the second platen roller 352, thereby avoiding unnecessary consumption of the ink ribbon 40.

When the fed label sheet 20 reaches the cutting unit 37, the control unit 100 drives the cutting unit motor 108 at the determined cutting timing to cut the label sheet 20 along the black mark 221. As a result, the control unit 100 issues from the label issuing port 10 a label on which an image such as a character string or the like is printed on the front surface and/or the back surface thereof.

Then, the control unit 100 continuously performs the above-described label issuing operation until the control unit 100 is instructed to stop the label printing through input received via the operation unit 5. The control unit 100 also separates the second print head 351 from the second platen roller 352 when the conveyance of the label sheet 20 is stopped.

In a case where the label printing is stopped, the label sheet 20 is back fed in order to prepare for subsequent label printing. However, when printing is performed on the back surface 22 of the label sheet 20 to which the adhesive is applied, the adhesive of the label sheet 20 may stick to the components arranged along conveyance path A, and a paper jam may occur. For example, in the printing device 1, in a case where the end of the label sheet 20 is fed back to a position between the first platen roller 342 and the second platen roller 352, the pressure sensitive adhesive on the back surface 22 of the label sheet 20 that descends in the gravity direction may stick to the second print head 351 or the ink ribbon 40.

Figure 7:
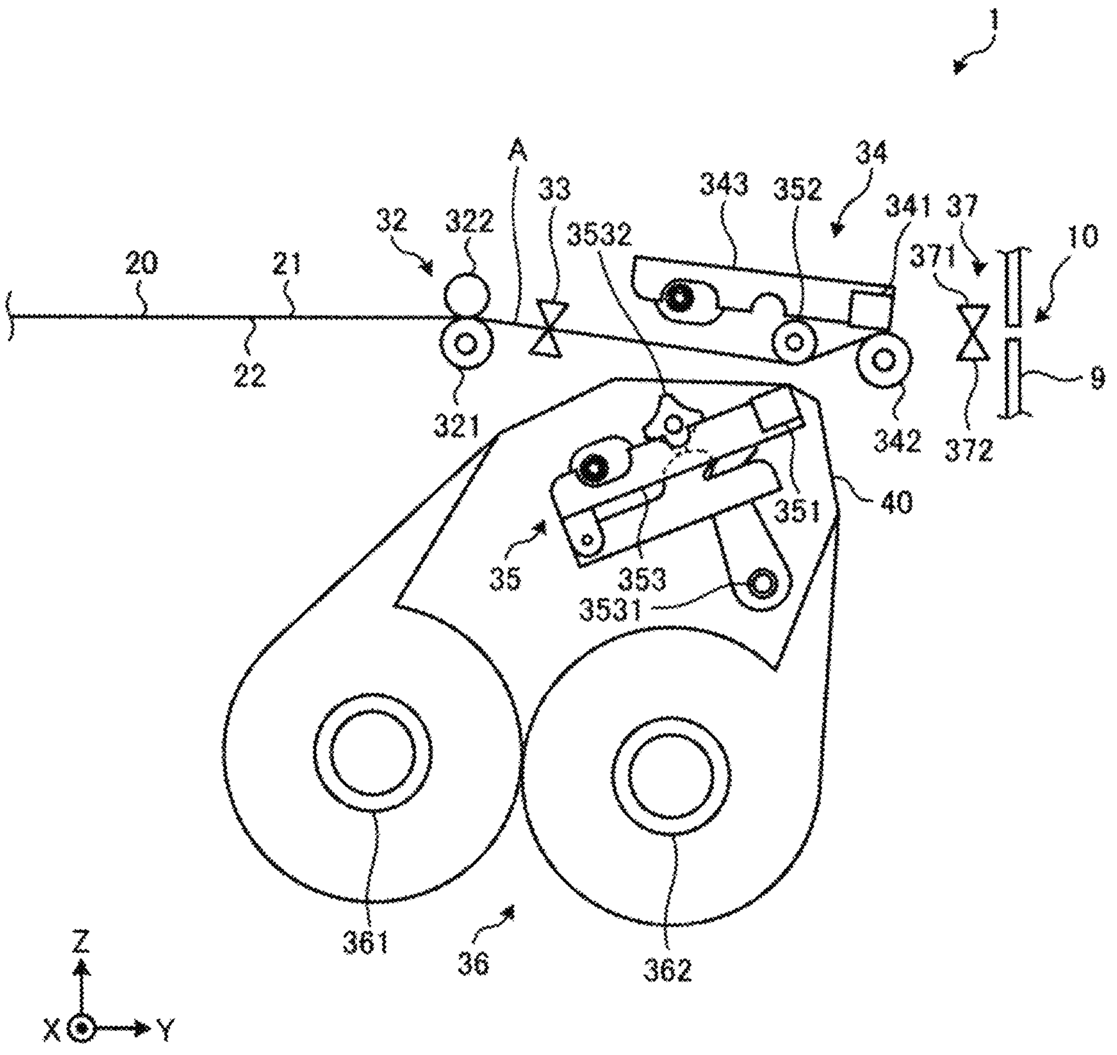
FIG. 7 is a diagram illustrating an internal structure of a printing device in a state where back feeding of a label sheet has been performed.

Therefore, in the printing device 1, after the label printing is stopped, the control unit 100 performs operations as shown in FIG. 7. That is, the end of the label sheet 20 that has been cut by the cutting unit 37 is fed back to the abutting position of the first print head 341 and the first platen roller 342.

FIG. 7 shows a state after the back feeding of the label sheet 20. As illustrated in FIG. 7, the end of the label sheet 20 is fed back to the abutting position between the first print head 341 and the first platen roller 342 under the control of the control unit 100.

Accordingly, the end of the label sheet 20 that has been fed back is nipped between the first print head 341 and the first platen roller 342. Further, on the upstream side, the label sheet 20 is nipped between the driving roller 321 and the driven roller 322. That is, the label sheet 20 that has been fed back is held in a stretched state between the driving roller 321 and the driven roller 322, and the first print head 341 and the first platen roller 342.

Therefore, in the printing device 1, even when the label sheet 20 is fed back, the adhesive on the back surface 22 of the label sheet 20 can be prevented from sticking to the components arranged along the conveyance path A, and the occurrence of paper jams can be suppressed.

While the label sheet 20 is being fed back, as illustrated in FIG. 7, the control unit 100 controls the cam 3532 to hold the second print head 351 in a state of being separated from the second platen roller 352. Since the ink ribbon 40 does not contact the pressure sensitive adhesive on the back surface 22 of the label sheet 20, it is possible to suppress the occurrence of paper jam or ribbon jam. The state of FIG. 7 is maintained until printing is resumed.

As described above, the separation distance between the first print head 341 and the second print head 351 is substantially identical with the width L from the black mark 221 to one side of the edge portion 222 on the back surface 22 of the label sheet 20 parallel to the black mark 221. Therefore, in the printing device 1, at the time of resuming printing, printing on the central region 223 can be started by bringing the second print head 351 into contact with the second platen roller 352 without further back-feed of the label sheet 20, thereby, the efficiency of printing processing can be improved.

As described above, the printing device 1 includes: the convey mechanism (e.g., the conveyance motor 106) that conveys the label sheet 20 having the adhesive applied to at least a part of the back surface 22; the first print head 341 that performs printing on the front surface 21 of the label sheet 20 conveyed in the feed direction; the first platen roller 342 that can nip the label sheet 20 between the first print head 341 and the first platen roller; a second print head 351 for printing on the rear surface 22 of the label sheet 20 conveyed in the feed direction, the second print head 351 disposed upstream of the first print head 341 in the feed direction; a second platen roller 352 capable of holding the label sheet 20 between itself and the second print head 351; the cutting unit 37 arranged on the downstream side of the first print head 341 in the feed direction for cutting the tip part of the printed label sheet 20; and the control unit 100 for controlling the conveying mechanism to back feed the cut label sheet 20 to the abutting position of the first print head 341 and the first platen roller 352.

Accordingly, since the printing device 1 can hold the end of the label sheet 20 between the first print head 341 and the first platen roller 342, it is possible to prevent the label sheet 20 after the back feed from sticking to the components arranged along the conveyance path A. Therefore, the printing device 1 can suppress the occurrence of a jam due to the back feed.

In the above-described embodiments, the printing device 1 performs printing on linerless labels. However, the printing device 1 may perform printing on any linerless paper or sheet other than the label sheet 20, on which an adhesive is applied. The printer device 1 described above has a first printing unit 34 of a direct thermal type disposed on the conveyance path A on the downstream side of second printing unit 35 which is a thermal transfer type using ink ribbon 40. However, the arrangement order of the first printing unit 34 and the second printing unit 35 may be switched in the printer device 1.

One or more programs to be executed by the printing device 1 according to the above-described embodiments may be recorded on a non-transitory computer-readable recording medium, such as a compact disc read-only memory (CD-ROM), a flexible disk (FD), or a CD-R, DVD (Digital Versatile Disk), in a file format installable or executable, and copied to the storage unit 104.

The programs executed by the printing device 1 may be stored on a computer connected to a network such as the Internet and downloaded via the network. Furthermore, it is possible to provide and distribute the programs executed by the printing device 1 via the network such as the Internet.

Further, the programs executed by the printing device 1 according to the above-described embodiments may be stored in the ROM 102.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing device for printing on a label sheet to which an adhesive is partially applied, comprising:

a first print head configured to perform printing on a first surface of a label sheet conveyed along a conveyance path in a first direction;

a first roller adjacent to the first print head across the conveyance path, the label sheet passing between the first print head and the first roller when conveyed along the conveyance path;

a second print head upstream of the first print head along the conveyance path and configured to perform printing on a second surface of the label sheet when the label sheet is conveyed along the conveyance path in the first direction, wherein the second surface is opposite to the first surface and the adhesive is partially applied to the second surface;

a second roller adjacent to the second print head across the conveyance path, the label sheet passing between the second print head and the second roller when conveyed along the conveyance path;

a cutting unit downstream of the first print head along the conveyance path and configured to cut off a first portion of the label sheet; and a processor configured to, after the first portion is cut off, cause the label sheet to be conveyed in a second direction opposite to the first direction such that an end of the label sheet from which the first portion was cut off reaches the first print head and is held between the first print head and the first roller.

2. The printing device according to claim 1, wherein the first print head is a direct thermal type print head.

3. The printing device according to claim 2, wherein the second print head is a thermal transfer type print head that performs printing by transferring ink from an ink ribbon.

4. The printing device according to claim 1, wherein the second print head is movable to separate from the second roller.

5. The printing device according to claim 4, further comprising:

a cam disposed upstream of the second print head along the conveyance path by which the second print head is moved.

6. The printing device according to claim 5, wherein the processor is further configured to control the cam to move the second print head to separate from the second roller when the label sheet is being conveyed in the second direction.

7. The printing device according to claim 1, wherein a first portion of the conveyance path between the first and second rollers is inclined with respect to a second portion of the conveyance path between the first roller and the cutting unit and a third portion of the conveyance path upstream of the second roller.

8. The printing device according to claim 1, wherein a distance between the first and second print heads is substantially equal to a width in the first direction of a region on which the adhesive is applied on the second surface of the label sheet.

9. The printing device according to claim 1, further comprising:

a sensor configured to detect a mark on the label sheet, wherein the processor is configured to control the cutting unit based on an output from the sensor to cut the sheet along the mark.

10. The printing device according to claim 1, further comprising:

a first case in which the processor is housed, and a second case in which the first and second print heads and the first and second rollers are housed, wherein the cutting unit is attached to the second case.

11. The printing device according to claim 10, further comprising:

an operation panel disposed on the second case and by which an instruction to start printing can be input.

12. The printing device according to claim 1, wherein the adhesive is applied to the end on the second surface of the label sheet from which the first portion was cut off, and the end on the second surface of the label sheet from which the first portion was cut off contacts the first roller on which an adhesive reduction treatment has been performed.

13. The printing device according to claim 1, further comprising:

a cam disposed upstream of the second print head along the conveyance path and by which the second print head is rotated between first and second positions, wherein when the printing is performed, the cam rotates the second print head to the first position at which the second print head presses the label sheet upwardly, and when the printing is not performed, the cam rotates the second print head to the second position lower than the first position.

14. A method of controlling a printing device for printing on a label sheet to which an adhesive has been partially applied, the method comprising:

performing printing with a first print head on a first surface of the label sheet being conveyed in a first direction along a conveyance path;

performing printing with a second print head on a second surface of the label sheet, the second surface being opposite to the first surface, the second print head being upstream of the first print head along the conveyance path, the adhesive being partially applied to the second surface of the label sheet;

cutting off a first portion of the label sheet using a cutting unit along the conveyance path downstream of the first print head after the printing has been performed on at least one of the first and second surfaces; and after the first portion is cut off, conveying the label sheet in a second direction opposite to the first direction such that an end of the label sheet from which the first portion was cut off reaches the first print head and is held between the first print head and a first roller that is adjacent to the first print head across the conveyance path.

15. The method according to claim 14, wherein performing printing on the first surface includes applying heat to the first surface of the label sheet to which a chemical agent that develops color when heated has been applied.

16. The method according to claim 15, wherein performing printing on the second surface includes transferring ink from an ink ribbon to the second surface of the label sheet.

17. The method according to claim 14, further comprising:

separating the second print head from a second roller adjacent to the second print head when the label sheet is being conveyed in the second direction.

18. The method according to claim 14, wherein a first portion of the conveyance path between the first and second rollers is inclined with respect to a second portion of the conveyance path between the first roller and the cutting unit and a third portion of the conveyance path upstream of the second roller.

19. The method according to claim 14, wherein a distance between the first and second print heads is substantially equal to a width in the first direction of a region on the second surface of the label sheet to which the adhesive is applied.

20. The method according to claim 14, further comprising:

detecting a mark on the sheet, wherein the sheet is cut by the cutting unit along the detected mark.

* * * * *